United States Patent [19]

Romano et al.

[11] Patent Number: 4,571,712
[45] Date of Patent: Feb. 18, 1986

[54] BEAM ALIGNMENT SIGNAL PROCESSING

[75] Inventors: Paul M. Romano; James W. Baer; James W. Hargarten, all of Boulder County, Colo.

[73] Assignee: Storage Technology Partners II, Louisville, Colo.

[21] Appl. No.: 628,682

[22] Filed: Jul. 6, 1984

[51] Int. Cl.$^4$ .............................................. G11B 7/00
[52] U.S. Cl. ........................................ 369/44; 369/46
[58] Field of Search ............... 369/44, 45, 46, 100, 369/111; 250/201, 202; 365/215, 234

[56] References Cited

U.S. PATENT DOCUMENTS 4,290,122 9/1981 Bates et al. .......................... 365/234
4,432,083 2/1984 Hsieh et al. .......................... 369/44

Primary Examiner—Donald McElheny, Jr.
Attorney, Agent, or Firm—Bryant R. Gold; James R. Young

[57] ABSTRACT

A beam alignment signal processing system wherein a true beam position error signal is generated regardless of beam intensity. This beam position error signal is used within a beam alignment system that maintains a desired alignment between first and second beams traveling in parallel along a desired optical path. A detector senses the position of the beams as the beams (or portions of the beams) are directed onto a surface thereof. The detector generates a set of position signals that indicate the position at which a beam, or at which an energy centroid associated with a plurality of beams, falls upon the detector surface. A first set of position signals is generated corresponding to the position of the first beam on the detector surface with the second beam turned off. These signals are stored in signal storage means. The second beam is turned back on, and a second set of position signals is generated corresponding to the position of the centroid of the first and second beams on the detector surface. A third set of position signals is then generated from the first and second set of position signals corresponding to the position of the second beam on the detector surface. The position error signal is finally generated from the first and third sets of position signals. Detector offset correction means are employed to remove the effects of detector offset from the sets of position signals. Normalization means are likewise employed to remove the effects of beam intensity variations from the sets of position signals.

15 Claims, 11 Drawing Figures

BEAM ALIGNMENT SIGNAL PROCESSING

BACKGROUND OF THE INVENTION

The present invention relates to beam alignment systems, and more particularly to a beam alignment signal processing scheme that may be used to process the position signals associated with the beams being aligned by the beam alignment system where one of the beams remains on all the time.

In an optical disk storage system, data is stored by marking a rotating disk with a beam of radiant energy (typically a laser beam) that is modulated in some fashion by the data to be stored. To write or store data on the disk, the modulated beam is directed to and focused at a desired point (termed the "write point" for purposes of this application) on the surface of the disk. As the disk rotates under the write point, a "data track" is created by the marks made on the disk by the modulated beam. If the write point is held stationary, a circular data track is created centered about the axis of rotation of the rotating disk. Additional data tracks, each concentric with the others, can be created by blanking the write beam off, moving the write point radially with respect to the disk to a new location, holding the write point stationary at this new location, and turning the modulated write beam back on. Alternatively, if the write point is radially moved with respect to the disk as the modulated write beam makes marks thereon, a spiralling data track is created on the surface of the disk.

Whether the data tracks are concentric or spiralling, the available surface area on the disk is most efficiently used when the data tracks are spaced together as close as possible. The radial distance between adjacent data tracks is called the "track pitch". Accurately maintaining the track pitch at a desired value, especially where the track pitch must be kept small so as to efficiently make use of the storage space available on the disk, has presented a significant obstacle in the development of high storage capacity optical disk storage systems. Beam alignment systems are used to properly align a write beam with a read beam so that a desired track pitch can be maintained. Such systems align a write beam with a read beam that is following a previously written data track. Hence, as a new data track is written by the write beam, it will be aligned (have a desired track pitch) with the previously written track that the read beam is following.

A significant problem associated with such beam alignment systems is in the generation of a position signal or signals that indicate the relative alignment between the two beams. Such alignment is usually measured with a detector that is placed in the beam path, or that has split-off portions of the beams to be aligned directed thereto. However, a problem still exists in ascertaining the true position of a beam incident on the detector, regardless of the intensity of the incident beam or the number of beams that are present. A related problem exists where the detector has a plurality of beams incident thereto and one of the incident beams may not be turned off without turning off all of the beams.

SUMMARY OF THE INVENTION

It is an object of the present invention to provide a system for processing the position signals associated with a beam alignment system, which alignment system aligns one optical beam at a prescribed distance with respect to another optical beam.

It is a further object of the present invention to provide a method of generating a position error signal for use in a beam alignment system, which position error signal provides an accurate indication of the relative positions of the beam being aligned regardless of their respective intensity levels.

A further object of the present invention is to provide such a system and method for generating a position error signal for use in a beam alignment system wherein one of the beams to be aligned may not be turned off without turning off all of the beams at the location where the beams are sensed.

Still another object of the invention is to provide a beam alignment position error signal generating system for use with a lateral photodetector, which detector detects the lateral position of a beam falling upon a surface thereof relative to a prescribed axis.

The above and other objects of the present invention are realized in a beam alignment signal processing system wherein a position error signal is generated that indicates the separation between two beams incident upon a detector surface. Advantageously, the position error signal is insensitive to variations in the intensity of either beam. Further, the position error signal may be generated even though one of the beams falling upon the detector surface may not be turned off without turning off the other beams incident to the detector.

The beam alignment system maintains a first beam within a prescribed alignment with respect to a second beam as these beams pass through a desired optical path. The beam alignment system includes a primary optical path through which a reference beam, e.g., the second beam, is directed. Another beam, e.g., the first beam, is controllably directed to the primary optical path so that the first beam travels therethrough substantially parallel to the second beam, but wherein the precise alignment between the two beams is controlled by beam steering means applied to the first beam prior to its entry into the primary optical path. Suitable detection means are employed to detect the spacing between the two beams in the primary path. Feedback from this detection means controls the beam steering means applied to the first beam so that the desired spacing between the two beams can be accurately maintained.

The signal processing system used in conjunction with the beam alignment system includes: (1) normalization means for removing the effects of intensity variations in the beams that fall upon the detector surface; and (2) storage means for remembering the position information associated with one beam that falls upon the detector surface at a time when the other beam is blanked off, and that determines the offset associated with the detector when all the beams are blanked off. The normalization means is realized using signal processing circuitry that includes sum and difference channels that generate sum and difference signals of the raw detector signals, which raw signals include both intensity and position information. The difference signal derived from the difference channel is divided by the sum signal derived from the sum channel to produce a normalized signal that contains only position information. The storage means are realized through the use of sample and hold circuits.

In operation, both beams are turned off and the inherent offset associated with the detector is measured and stored in sample and hold circuits in both the difference and sum channels. Then, one beam is turned on and corresponding single beam sum and difference signals are generated, which signals include the inherent offset of the detector. This single beam signal is also stored in respective sample and hold circuits in the sum and difference channels. The offset held in one set of sample and hold circuits is subtracted from the offset plus single beam signal held in the other set of sample and hold circuits in order to produce a pure (minus offset) first beam signal. This first beam signal is then normalized to produce a true position signal of the first beam that is not affected by the intensity of the single beam.

Once the true position signal of the first beam is generated, the other beam is turned on so that both beams are incident to the detector. Corresponding dual beam sum and difference signals are thus generated, which signals also include the inherent offset of the detector. The single beam plus offset signal held in the one set of sample and hold circuits is then subtracted from the dual beam plus offset signal to produce a pure (minus offset) second beam signal. This second beam signal is then normalized to produce a ture position signal of the second beam, even though both the first and second beams were on when this measurement is made. Finally, the true position signal of the first beam is subtracted from the true position signal of the second beam to produce a desired position error signal (PES) that is an accurate measure of the position difference between the two beams.

When employed within an optical disk storage system, the beam alignment system used in conjunction with the present invention provides a write alignment servo system wherein newly written data tracks on a storage disk used within such a storage system may be spaced a fixed distance or "track pitch" from a previously written track. In such a system, a reference beam follows a previously written track using conventional beam tracking techniques. A write beam is then positioned at a desired distance from the reference beam in accordance with the beam alignment system described above. Thus, as the two beams pass through the primary path and strike the write point or area on the disk surface, the write beam is positioned a prescribed distance from the previously written track that the reference beam is following.

BRIEF DESCRIPTION OF THE DRAWINGS

The above and other objects, features, and advantages of the present invention will be more apparent from the following more particular description thereof presented in conjunction with the following drawings, wherein:

FIG. 8 is a perspective optical schematic diagram of all the optical components, FIG. 9 is a block diagram of the read optics, FIG. 10 is a block diagram of the write optics, and FIG. 11 is a block diagram of the coarse seek optics.

DETAILED DESCRIPTION OF THE INVENTION

The following description is of the best presently contemplated mode of carrying out the invention. This description is not to be taken in a limiting sense, but is made merely for the purpose of describing the general principles of the invention. The scope of the invention should be determined with reference to the appended claims.

Figure 1:
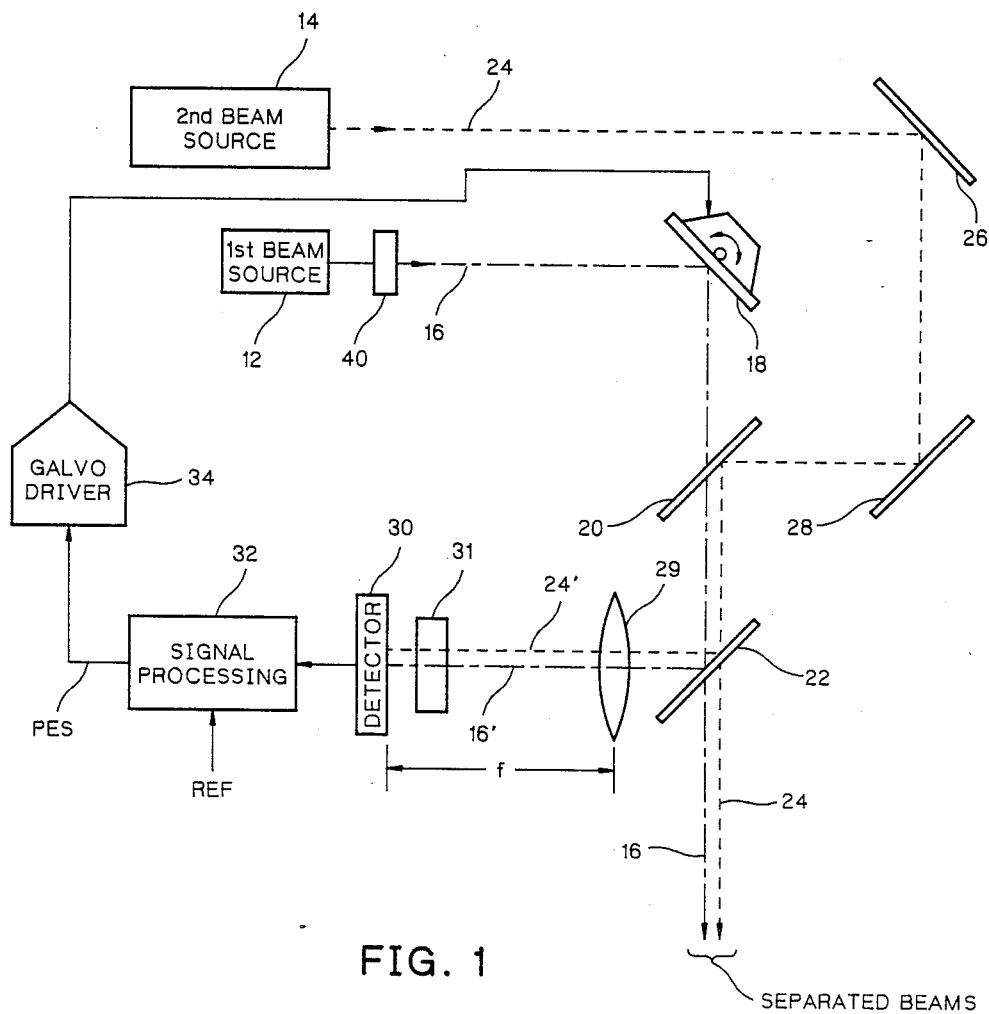
FIG. 1 is a block diagram of the beam alignment system of the present invention.

Referring to FIG. 1, there is shown a block diagram of the beam alignment system of the present invention. A first beam source 12 and a second beam source 14 respectively generate radiation beams that follow the paths indicated. The beam from the first beam source 12 is represented by the dashed single-dot line 16. As indicated in the figure, the beam 16 is reflected off of a galvonometer controlled mirror 18, passes through a beam combiner 20, and a beam splitter 2, and continues along an optical path in the direction indicated. (It is to be understood that in connection with FIGS. 1 and 2, when reference is made to a beam, such as the beam 16, that the path which the beam is following may also be referred to as the optical path 16 along which the beam 16 is travelling.)

The second beam source 14 also generates a beam 24, represented as a dashed line in FIG. 1, which follows a path that reflects off of a mirror surface 26, a mirror surface 28, and a surface of the beam combiner 20. At the beam combiner 20, the path of the beam 24 is substantially parallel to the path of the beam 16, although variations in the angle of the galvonometer controlled mirror 18 may cause the beam 16 to be somewhat out of parallel with the beam 24. However, as those skilled in the art will recognize, the angular displacement of the galvonometer controlled mirror 18 is very slight, and the two beams 16 and 24 are considered to be following the same optical path even though one is not truly parallel to the other.

As the beam 16 passes through the beam splitter 22, a portion of the beam 16, represented as 16', is split off of the beam 16 and focused onto a detector 30 with a lens 29. Likewise, a portion 24' of the beam 24 is split off from the beam 24 as the beam 24 passes through the beam splitter 22. The split off portion 24' is likewise focused onto the detector 30 with lens 29. A shutter 31 allows the beams 16' and 24' to be blanked off and prevented from falling upon the detector 30. Advantageously, the alignment between the split off beams 16' and 24' is proportional to the alignment of the beams 16 and 24 as these beams pass through the beam splitter 22. This means that the spacing between the beams 16' and 24' at the point where these beams strike the surface of the detector 30 is proportional to the spacing between the beams 16 and 24 at the point where the beams 16 and 24 pass through the beam splitter 22. Hence, the alignment between the beams 16' and 24' at the surface of the detector 30 will be proportional to the alignment between the beams 16 and 24 anywhere along the common path shared by the beams 16 and 24.

The detector 30 measures the lateral spacing or distance between the two beams 16' and 24' at the point where the beams fall upon a surface of the detector. This distance measurement is processed by signal processing circuitry 32, which circuitry generates an error signal. This error signal represents the difference between the measured beam separation or spacing and a desired beam separating or spacing. As such, the error signal is referred to as a position error signal (PES). After being appropriately amplified and buffered in a galvo-driver 34, the PES is used to steer the galvonometer controlled mirror 18. Conventional servo control techniques are used to drive the PES signal to zero, thereby forcing the beam 16 to assume a desired alignment with respect to the beam 24.

Figure 2:
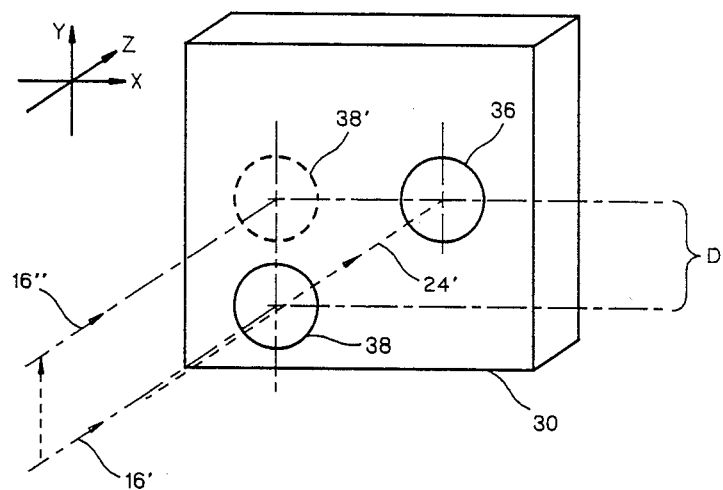
FIG. 2 is a perspective view of the detector of FIG. 1, showing how two beams may be laterally aligned thereon.

Referring to FIG. 2, a perspective view of the front surface of the detector 30 is shown to illustrate how the beam 16' is laterally aligned with the beam 24'. As shown in FIG. 2, the beam 16' strikes the surface of the detector 30 at a spot location 36. Similarly, the beam 24' strikes the detector 30 at a spot location 38. As illustrated in the figure, this spot 38 is not laterally aligned with the spot 36. (For purposes of FIG. 1, laterally aligned means in the Y direction.) The detector 30 measures the distance D between the center locations of the spots 38 and 36. The PES signal (FIG. 1) is a signal having a prescribed parameter (amplitude, phase, etc.) that is proportional to the distance D. The galvo-driver 34 responds to this PES signal in order to move the galvonometer controlled mirror 18 in a direction that causes the beam 16' to be deflected in the position Y direction until the distance D is reduced to zero, thereby indicating lateral alignment between the two beams 16' and 24'. In FIG. 2, the aligned position of the beam 16' is represented as the beam 16" and the spot 38'.

Referring back to FIG. 1, a shutter 40 or other suitable blanking device may be placed near the first beam source 12 in order to selectively turn the beam 16 on or off. The shutter 40 may physically block the beam 16 from following its desired path, or it may be simply attenuate of the beam 16 to reduce its intensity below a prescribed threshold value. For many applications of a beam alignment system of the type shown in FIG. 1, it is not feasible nor desirable to place a shutter or equivalent in the path of the beam 24. Thus, the beam 24 remains on all the time, and only the beam 16 can be selectively turned on and off. Further, as is evident from FIG. 1, the shutter 31 can only block both of the beams 16' and 24' from reaching the detector 30. Hence, through the use of both shutters 40 and 31, the beams reaching the detector 30 can be selected to be: (1) no beams; (2) beam 24'; or (3) beams 16' and 24'. It is not possible to have just beam 16' focussed onto the detector. How such a system (having one beam that cannot be singly focussed onto the detector) is adapted for use with the beam alignment system of the present invention is explained more fully below in connection with FIG. 3.

Unfortunately, the beam intensity and position information included within the signal generated by the detector 30 are not separate and distinct, but are included within the same signal. Hence, accurate position information can be obtained only when the two beams 16' and 24' fall upon the surface of the detector 30 with the same intensity. Because maintaining two beams from separate sources at precisely the same intensity levels is difficult at best, it is desirable to process the measurement signal from the detector 30 so as to remove the intensity variations therefrom. The process of removing the intensity variations from the detector measurement is referred to as "normalization". The scheme by which normalization is achieved, and by which a true PES signal is obtained for a system wherein one of the beams cannot be focussed by itself onto the alignment detector is illustrated in FIG. 3, discussed below.

Figure 3:
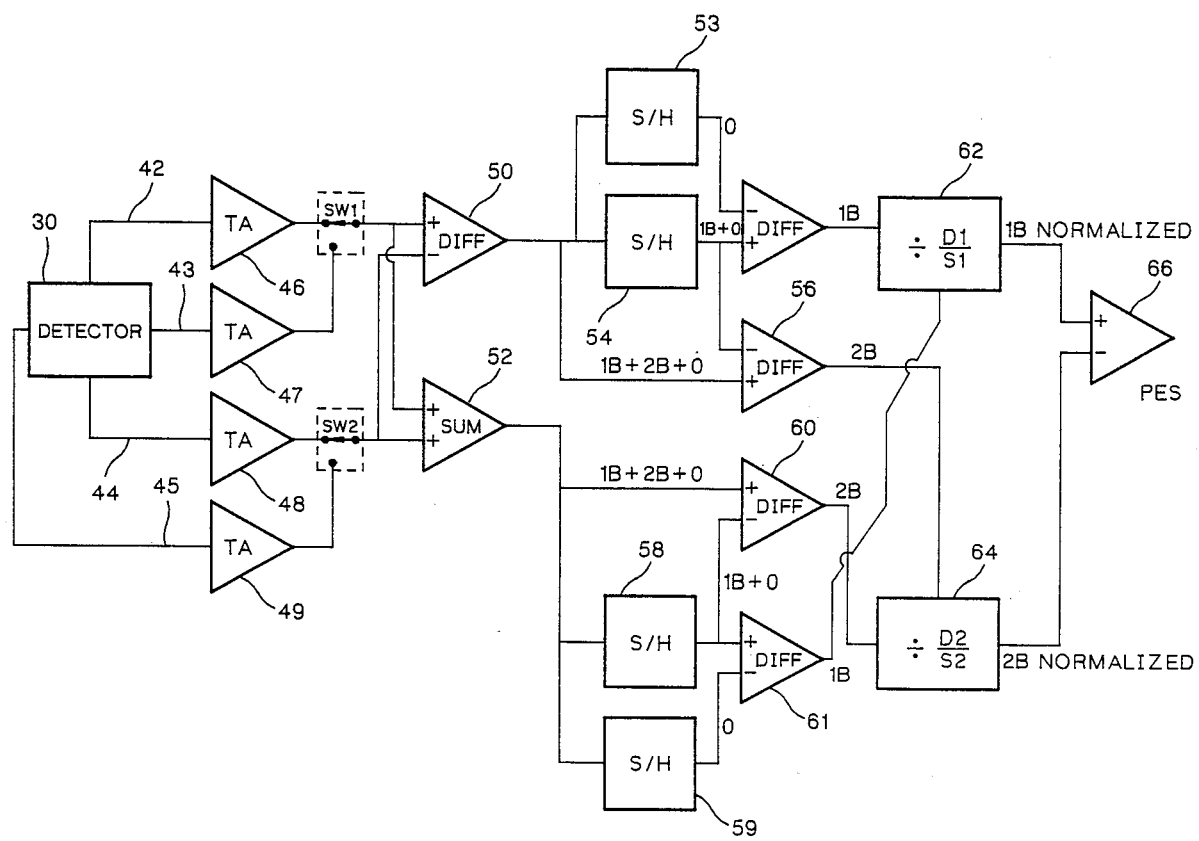
FIG. 3 is a block diagram of the signal processing circuitry of FIG. 1.

Before referring to FIG. 3, however, reference is made again to FIG. 2 for the purpose of explaining how a preferred embodiment of the detector 30 functions. There are many types of detectors known in the art that could perform the measurement function illustrated in FIG. 2. The beam alignment system of the present invention is adapted for use with beam spots that are relatively small, on the order of 100 microns in diameter. For beam spots that small, special care must be exercised in order to ensure that beam spot position is accurately measured.

In a preferred embodiment of the present invention, the detector 30 is realized using a dual axis position sensor, or a lateral effect photodiode, that provides X and Y axis position information of a light spot on the detector surface. The device senses the "centroid" of all the radiation energy falling thereon, and provides a continuous analog output as this centroid spot moves from a null point to the limit of the active area. A suitable detector for this purpose is manufactured by United Detector Technology, of Culver City, Calif.; and is marketed under the model number of PIN-SC/4D. The output signal generated by this particular model of the detector is a dual pair of currents, the difference between each of which has an amplitude proportional to the position of the centroid of the radiation falling upon the detector surface as measured along a prescribed axis thereof. Unfortunately, each current signal also has an amplitude that is affected by the intensity of the radiation hitting the detection surface. (For purposes of this application, the term "centroid" refers to the "center of mass" of the radiant energy that strikes the surface of the detector. Also, it should be noted, that although the preferred embodiment of the detector is a dual axis detector, capable of sensing position information in both the X and Y direction, for purposes of the basic invention illustrated in FIG. 1, only a signal axis need be detected. Accordingly, a split detector could be used for the detector 30 that merely senses when a particular spot is centrally aligned with a given axis.)

Now referring to FIG. 3, there is shown a block diagram of the signal processing circuitry 32 of FIG. 1. Four output signals are generated by the detector, each of which appears on respective signal lines 42, 43, 44, and 45. These signals, as indicated above in the description of the preferred embodiment, are current signals.

Each current signal is directed to respective transimpedence amplifiers 46, 47, 48, and 49 whereat the current signal is converted to a voltage signal. The signals on signal lines 42 and 44 relate to the position and intensity of the beam(s) falling on the detector 30 as measured relative to one axis thereof (e.g., the Y axis), while the signals on signal lines 43 and 45 relate to the position and intensity of the beam(s) as measured relative to another axis thereof (e.g., the X axis). The output of two selected transimpedence amplifiers, 46 and 48, or 47 and 49, is directed to a difference amplifier 50 and a summing amplifier 52. The output of the difference amplifier 50 is directed to a sample and hold circuits 53 and 54 and to the positive input of a second difference amplifier 56. The negative input to the difference amplifier 56 is the output from the sample and hold circuit 54. The output of the summing amplifier 52 is similarly directed to a sample and hold circuits 58 and 59. The output of the summing amplifier 52 is also directed to the positive input of a third difference amplifier 60. The negative input to the difference amplifier 60 is the signal from the output of the sample and hold circuit 58. A fifth difference amplifier 55 has the output of sample and hold circuit 54 connected to the positive input thereof, and the output of sample and hold circuit 53 connected to the negative input thereof. A sixth difference amplifier 61 has the output of sample and hold circuit 59 connected to the negative input thereof, and the output of sample and hold circuit 58 connected to the positive input thereof. A first dividing circuit 62 divides the output signal of difference amplifier 55 by the output signal of difference amplifier 61. A second divider circuit 64 divides the output signal of difference amplifier 56 by the output signal of difference amplifier 60. The difference between the output signals of the dividing circuits 62 and 64 is determined in a seventh difference amplifier 66, the output of which is the position error signal (PES) that is used to control the galvonometer controlled mirror 18 (FIG. 1).

In operation, the signal processing circuitry of FIG. 3 functions as follows. Switches SW1 and SW2 are selectively switched to connect transimpedance amplifiers 46 and 48, or 47 and 49, into the circuit, depending upon which axis measurement is desired. The output signals from the detector 30, as indicated above, are current signals having an amplitude that includes both position and intensity information. These signals are converted to respective voltage signals by the transimpedence amplifiers 46 and 48, or 47 and 49. Because two beams are falling upon the detector surface 30 during normal operation of the beam alignment system, and because the signals appearing on signal lines 42 and 44 (or 43 and 45) would contain position information relative to a single centroid associated with both of these beams, it is necessary to process these signals to determine the position of the centroid of each beam so that the distance between the centroids of these two beams can be determined. The way that this is done is to turn both beams 16' and 24' off (close shutter 31) so that only the offsets inherent to the operation of the detector 30 are generated. These offset signals are stored for later reference. Then the first beam 16 is turned off (open shutter 31, close shutter 40) so that only the beam 24' is falling upon the surface of the detector. This single beam information is then stored for later reference. Then the beam 16 is turned on (open shutter 40) and both the beams 16' and 24' are allowed to fall upon the surface of the detector 30. The combined spot centroid, i.e., the signal generated while both spots are falling upon the detector, has the previously stored signal spot information subtracted therefrom in order to generate a signal that represents the position of the second spot. The stored offset signals are also appropriately subtracted from these first and second spot signals so that pure position signals are obtained. The signal processing circuitry further normalizes the signals so that the intensity information embodied within the signals is removed, thereby providing a PES signal that is truly independent of beam intensity and is only a function of beam position. To illustrate this process in more detail, consider the outputs of the difference amplifier 52 and the sum amplifier 52 when no beams are incident on the detector. Any output signals present under this no beam condition are attributable to offsets associated with the detector 30 or related circuitry. The value of this offset is stored in sample and hold circuits 53 and 59 and is labeled "O" in FIG. 3. When only beam 24' is incident on the detector 30, the output signals of the sum and difference amplifiers 52 and 50 are attributable to beam 24' plus the built-in offsets. The value of these signals are stored in sample and hold circuits 54 and 58 and are labeled "1B+O" (single beam plus offset) on FIG. 3. Note that difference amplifiers 55 and 61 subtract the offset signal "O" held in sample and hold circuits 53 and 59 from the single beam plus offset signal "1B+O" held in sample and hold circuits 54 and 58, respectively. The result is a single beam signal "1B" that has the effects of offset removed therefrom. This signal is normalized in dividing circuit 62 so that the output of circuit 62 is a true position signal of the single beam 24'.

When both beams 24' and 16' are incident on the detector 30, the output signals of the sum and difference amplifiers 52 and 50 are attributable to both beams 16' and 24' plus the built-in offsets. The value of these dual beam signals (labeled "1B+2B+O" in FIG. 3) are differenced with the "1B+O" signals held in sample and hold circuits 54 and 58 in difference amplifiers 56 and 60 respectively. The net result is that the effects of the first beam "1B" plus the offset "O" are subtracted therefrom, leaving only a signal generated by the second beam "2B" as an input to the dividing circuit 64. The dividing circuit 64 normalizes this "2B" signal, resulting in a true beam position signal that represents the position of the second beam 16' on the surface of the detector 30.

Difference amplifier 66 generates the desired PES signal by taking the difference between the first beam position signal "1B" and the second beam position signal "2B".

The PES signal that is derived using the above-described process, defines the position error between the two spots as measured along one selected axis of the detector. Most of the variations that occur between these spots will typically occur along the Y axis if the optical components have been properly aligned. However, during the initial optical alignment of these components, as well as during subsequent diagnostic/error detection routines, it is desirable to derive an equivalent PES signal that defines the position error between the two spots as measured along the X axis of the detector. As indicated previously, the additional transimpedance amplifiers 47 and 49, which are tied to signal lines 43 and 45 of the detector, may be switchably coupled to the difference and sum amplifiers 50 and 52, respectively, for this purpose. This capability—of generating a PES signal representative of position error along two different axes of the detector—advantageously provides: (1) the ability to initially set the two spots (beams) at a desired alignment as measured along both axes of the detector; (2) the ability to verify that the spots or beams have the desired relationship therebetween (i.e., to verify that the write spot leads the read spot); and (3) the ability to periodically check the location of the spots on the detector surface to make sure they are confined to a desired region. (If the beams get too far off of a center region of the detector surface, the signals generated by the detector tend to become non-linear, resulting in some degradation of the accuracy of the alignment system).

Figure 4:
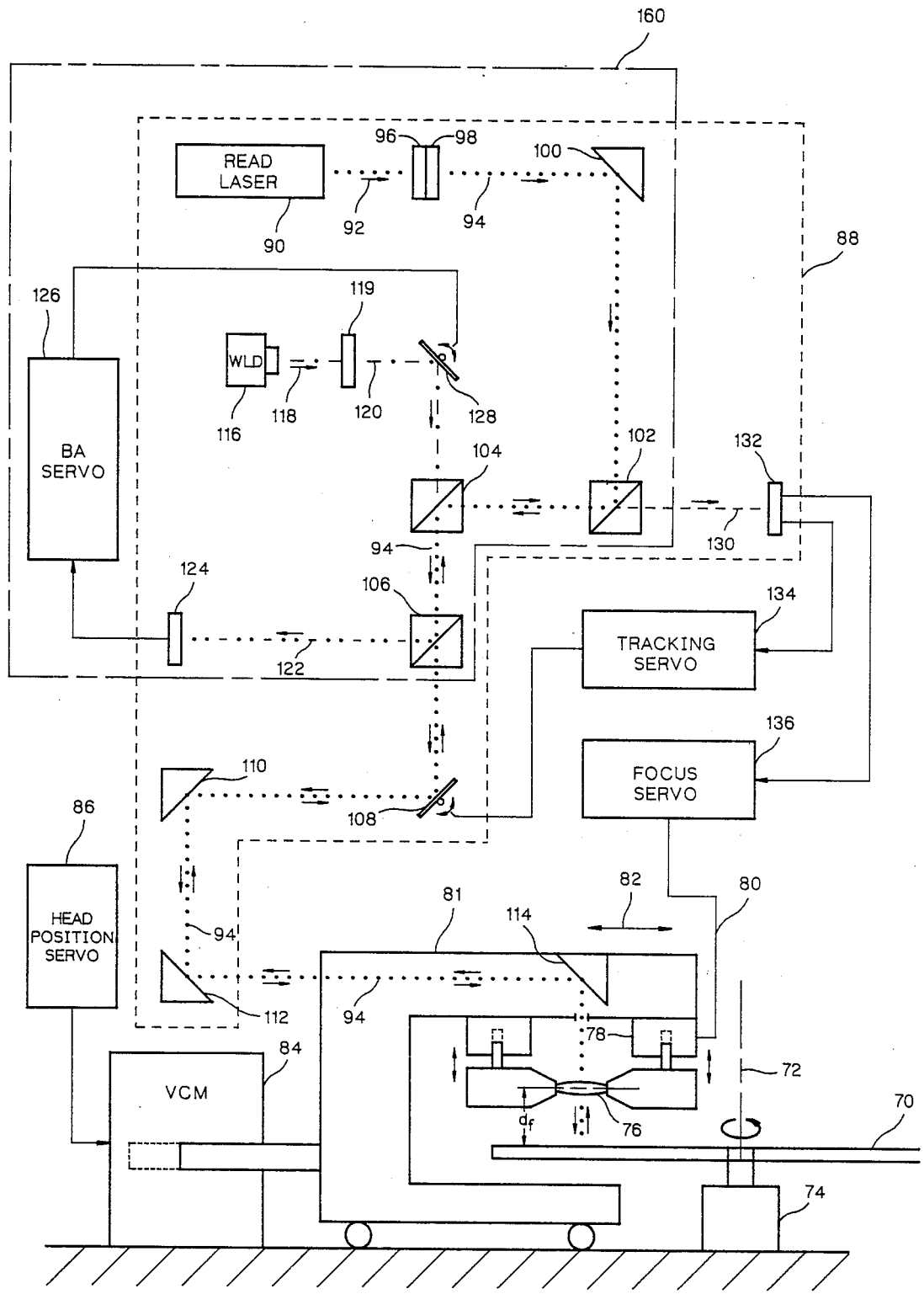
FIG. 4 is a block diagram showing how the present invention is used within an optical disk storage system in order to align a write beam with a read beam.

Referring next to FIG. 4, a block diagram of the beam alignment system of the present invention, comprising the elements enclosed within the dashed line 160, is shown in connection with the block diagram of an optical disk storage system. The invention is used in such a storage system to provide a desired alignment between a read beam and a write beam. The optical disk storage system includes a optical disk 70 that is rotated about a rotational access 72 by a motor 74. The disk 70 includes radiation sensitive layers placed thereon that can be marked by a beam of radiant energy. An objective lens 76 is disposed adjacent to the surface of the disk 70. The distance $d_f$ from of the lens 76 to the surface of the disk 70 is controllable by focusing means 78, which focusing means respond to a focus control signal appearing on signal line 80. The focus means 78 may be realized with any suitable means for achieving the desired motion, such as a voice coil motor (VCM), or the like.

The lens 76 and focusing means 78 are mounted to an optical head 81 that is slidably mounted for radial movement in the direction of the arrow 82 with respect to the disk 70. This movement is typically realized by means of a VCM 84 that positions the optical head 81 in response to a suitable control signal generated by a head position servo system 86. The details of the head position servo 86 are not important to the present invention, but a suitable positioning servo is described in co-pending U.S. patent application Ser. Nos. 438,133, filed Nov. 1, 1982, and 503,955, filed June 13, 1984, both of which are assigned to the same Assignee as is the present application.

The optical components used to generate the beams that are directed to the surface of the disk 70 are mounted on a stationary optical plate 88. These components include a read laser source 90 that generates a read beam 92. The beam 92 follows an optical path 94 indicated in FIG. 4 as a dotted line. As will be explained more fully below, the read beam 92 is diffracted into a plurality of beams by optical gratings 96 and 98. All of these beams are parallel having a fixed spacing therebetween as determined by the gratings 96 and 98, and they all follow the dotted line path 94. This path 94 directs the beam off of a mirrored surface 100, to a beam separator 102, to a beam combiner 104, through a beam splitter 106, off of a galvonometer controlled mirror 108, off of fixed mirrored surfaces 110 and 112, and into the optical head 81 where the path further includes at least one additional mirrored surface 114 which directs the beams following the path through the objective lens 76 onto a desired point of the surface of the rotating disk 70.

A write laser diode 116 generates a write laser beam 118 that follows an optical path 120 indicated by the dashed single-dot line in FIG. 4. This write path 120 joins the primary beam path 94 (dotted line) at the beam combiner 104. Hence, from the point of the beam combiner 104 to the surface of the disk 70, that path 94 is shared by both the read beams and the write beams. (The small arrows on either side of the optical path 94 indicate the direction that the various beams are traveling at that point along the path 94.)

The beam splitter 106 splits off a portion of the beams traveling through the path 94 and directs them along an optical path 122 represented in FIG. 4 by a dashed double-dot line. This path terminates at a beam alignment detector 124. The detector 124 is positioned so that only beams split off from the write beam 118 and a desired read beam are mapped onto the surface of the detector 124. The position of the spots appearing on the detector 124 are measured and processed in a beam alignment servo 126. The beam alignment servo 126 provides a control signal to a galvonometer controlled mirror 128 which steers the write beam 118 as it is fed into the optical path 94 at the beam combiner 104. The detector 124 may be of a type previously described in connection with FIGS. 1-3, and the beam alignment servo 126 essentially comprises the signal processing circuitry 32 and galvo-driver 34 described in connection with FIGS. 1 and 3.

The read beams that strike a surface of the disk 70 are reflected back along the optical path 94 all the way back to the beam separator 102. At this point, the reflected beams are directed along a path 130, represented in FIG. 4 as a dashed line. This path 130 directs these beams to a second optical detector 132. This detector 132 serves two functions: (1) it detects the position of a first group of read beams that fall upon a surface thereof and this information is fed to a tracking servo 134, which tracking servo provides the control signal for steering the galvonometer controlled mirror 108; and (2) it detects whether or not the beams that are falling upon the surface of the disk 70 are in focus, and feeds this information to focus servo circuitry 136, which focus servo 136 generates an appropriate control signal directed to the focusing means 78 over signal line 80 in order to place and maintain the lens 76 at a desired in-focus position. As can be seen from FIG. 4, the galvo mirror 108 jointly steers all of the beams that are traveling along the optical path 94 to and from the surface of the disk 70. Hence, the tracking servo 134 jointly steers all of the beams so that they strike the surface of the disk 70 at a desired location. The focus servo 136 ensures that all these beams are properly focused when they strike the surface of the disk 70.

Figure 5:
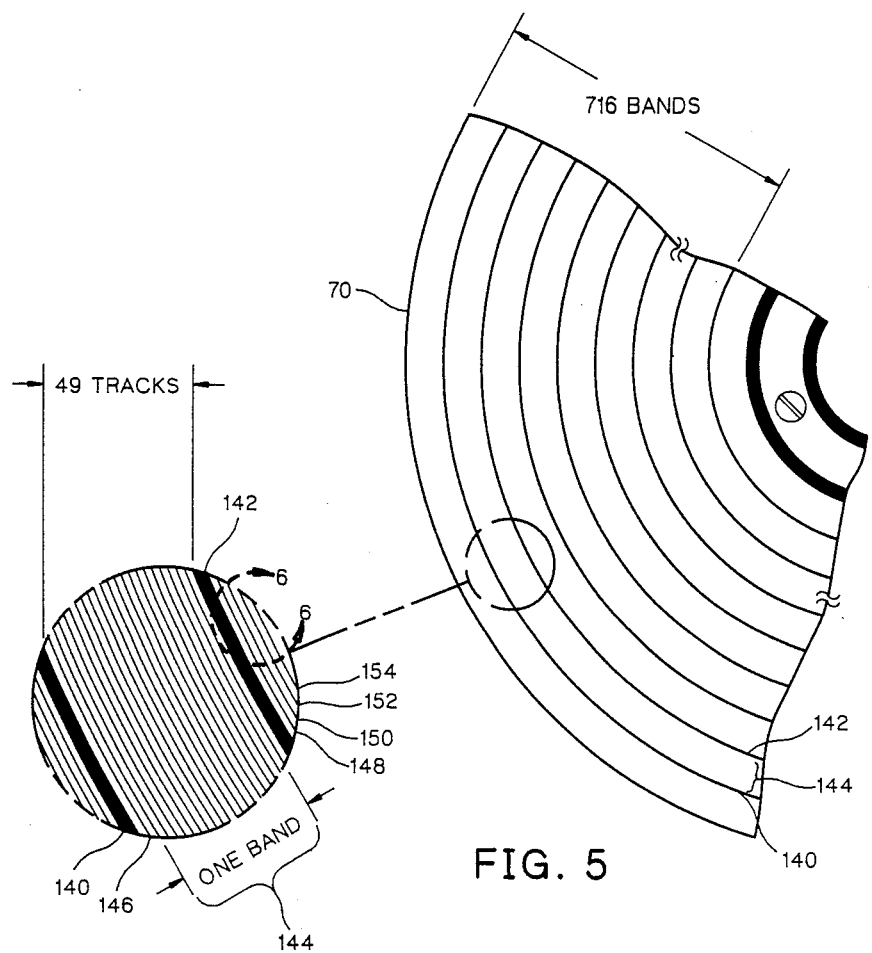
FIG. 5 is a top view of a disk used with the optical storage system of FIG. 4 showing how data bands and tracks are arranged thereon in relationship to coarse servo tracks that are concentrically spaced on the surface of the disk.
Figure 6:
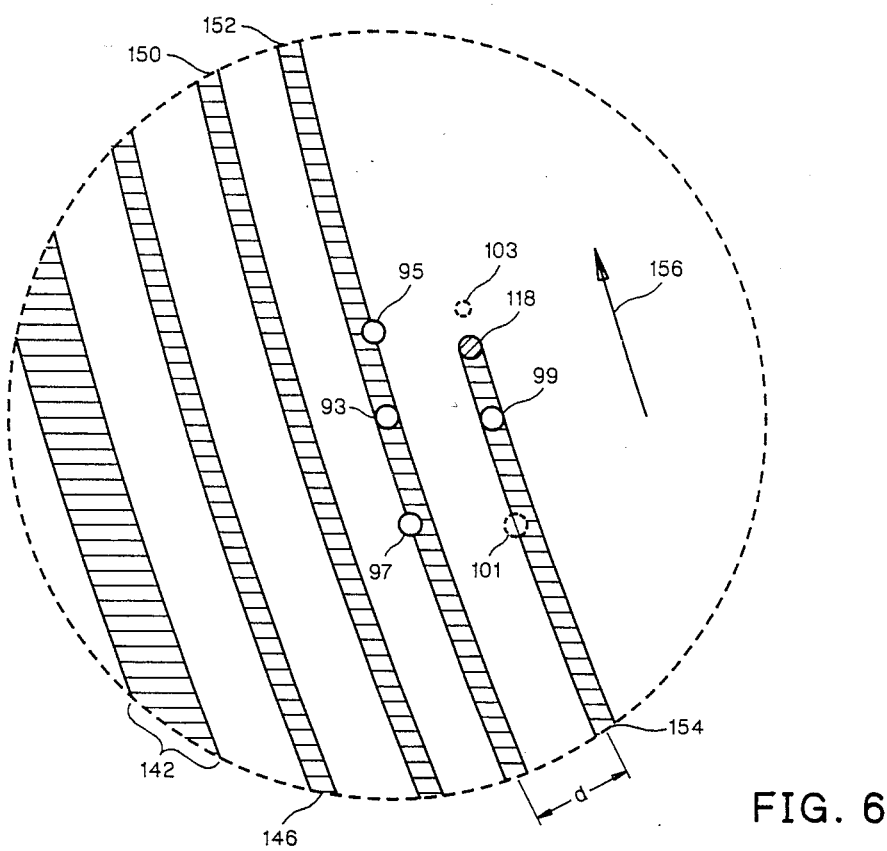
FIG. 6 is an enlarged view of the disk surface area bounded by the circular dashed line 6—6 in FIG. 5, and shows a how a plurality of read beams are used to follow a previously written data track and how a write beam is used to write a new data track that is a prescribed track pitch distance from a previously written data track.

In order to better understand the operation of the optical disk storage system illustrated in FIG. 4, and to better appreciate how the beam alignment system of the present invention is used therewithin, reference is now made to FIGS. 5 and 6 in order to illustrate how a preferred embodiment of the optical disk 70 is formatted. In FIG. 5, a portion of the disk 70 is illustrated. This disk is divided into a large number of concentric data bands comprising a plurality of data tracks into which data may be stored. Concentric coarse servo tracks separate one data band from another. Two such coarse servo tracks 140 and 142 are illustrated in the enlarged portion of FIG. 5. A first data track 146, adjacent to the coarse servo track 140, is previously written on the disk during the manufacture thereof and is used to identify the data band 144. This first data track in the data band is referred to as the "home address track". As illustrated in the figure, the data band 144 contains a large number of data tracks. In the preferred embodiment, 49 tracks, including the home address track 146, are included in a data band. Further, there are 716 such bands included on a given disk 70.

Referring to FIG. 6, an expanded view of a portion of the disk surface 70 encircled by the dashed line 6—6 is shown. This expanded view includes a portion of a coarse servo track 142, a home address track 146, two data tracks 150 and 152, and a partially written data track 154. In FIG. 6, it is assumed that the disk is rotating in the direction indicated by the arrow 156.

Included in FIG. 6 are a pattern of seven spots, representing the various beams that are directed to the surface of the disk along the optical path 94 (FIG. 4). The write beam 118 is directed to the write point on the disk so as to create the write track 154 as the disk rotates in the direction indicated by the arrow 156. The read beam 92 is split into 6 beams by the defraction gratings 96 and 98 (FIG. 4), and these beams are arranged in a pattern as illustrated in FIG. 6. A first read beam 93 is centered on the previously written data track 152. Track following beams 95 and 97 are positioned in front and behind the read beam 93 and offset so as to provide a dual beam tracking function as is known in the art. Basically, in accordance with the teachings of the art, the detector 132 (FIG. 4) is able to detect when the beams 95 and 97 are half on and half off of the track 152 which they are following. If they are not exactly half on and half off of the track, an error signal is generated by the track servo 134 to steer the beams in an appropriate direction to make them follow the track 152. The read beam 93 is positioned midway between the following beams 95 and 97, thereby causing the read beam 93 to precisely follow the track 152. An additional read beam 99 is positioned relative to the beams 93, 95, and 97, so as to fall behind the write beam a short distance. This read beam 99 is used to read the data written in the track 154 immediately after it has been written therein by the write beam so that if an error is detected the incorrect data may be flagged or marked and the data may be correctly written over again.

Two additional read beam spots 101, 103 are positioned relative to the read beam 99 in a configuration that is similar to the positioning of the tracking beams 95 and 97 with respect to the read beam 93. These "auxiliary" read tracking beams 101, 103 serve no purpose when a track is being written by a write beam as shown in FIG. 6. Hence, the beams are shown only as dashed circles. However, these beams do serve a valuable purpose during a calibration mode of the optical disk storage system, as explained below.

The optical disk 70 used in the optical storage system shown in FIG. 4 is preferably a removable disk that may be used in any compatible optical disk storage system. Because the various optical storage systems cannot be identically alike, there will be variations from system to system with respect to the alignment of the read beams created by the optical gratings 96 and 98. Moreover, some of the components used within the stationary optics plate 88 will drift somewhat over time and with variations in temperature. Therefore, a constant fixed stable pattern between the beams 93, 95, 97, 99, 101, and 103 cannot be guaranteed from system to system and over time. To account for these slight variations that will occur, and in order to guarantee a fixed track pitch distance, d (see FIG. 6), a track pitch calibration procedure is employed. One band on the disk 70 has previously written thereon, during the manufacture of the disk, a plurality of data tracks that are previously spaced at the desired track pitch. This precise spacing is achieved using precision servo writing equipment suitable for use in a disk manufacturing facility, but not feasible for use in an optical disk storage system. When a disk is first inserted into an optical disk storage system, the optical head 80 is positioned so that the previously written data tracks are positioned under the six read beams 93, 95, 97, 99, 101, and 103. During this calibration mode, the write beam is turned off. If the read beam pattern is perfectly aligned with these two read beam tracks, then the detector 132 and associated tracking servo circuitry 134 (FIG. 4) indicate this aligned position by generating an "on track" signal. (This on track signal is typically a null signal, although any signal scheme could be used to indicate an on track condition.) More often than not, however, the tracking servo 134 will indicate during this calibration mode that an error condition exists; that is, one of the precision written tracks is not aligned with the other precision written track as measured by the particular spot configuration of the optical drive storage system beam used. The magnitude of this error condition, referred to as an "offset", is converted to an offset measurement that is stored or saved for future reference. In effect, the "offset" represents a correction factor that must be used with the particular read beam configuration in order to position data tracks at the same track pitch as exists with the precision written tracks previously placed on the disk.

In operation, when it is desired to write a new data track on the disk, the beam alignment system of the present invention positions the write beam a desired distance (the track pitch) from the read beam as previously discussed. However, the position error signal (PES) generated by the beam alignment servo is modified or corrected by the amount of the "offset" that is measured during the track pitch calibration mode described in the previous paragraph. In this fashion, the track pitch is precisely maintained at the desired distance regardless of any variations that may exist in the optical components associated with the particular optical storage system that is used, or that occur over the life of the components being used. As previously indicated, maintaining a precise track pitch is extremely important in a high density storage system so that disk interchangeability and compatability exists from system to system and so that an optimum amount of data may be stored.

Figure 7:
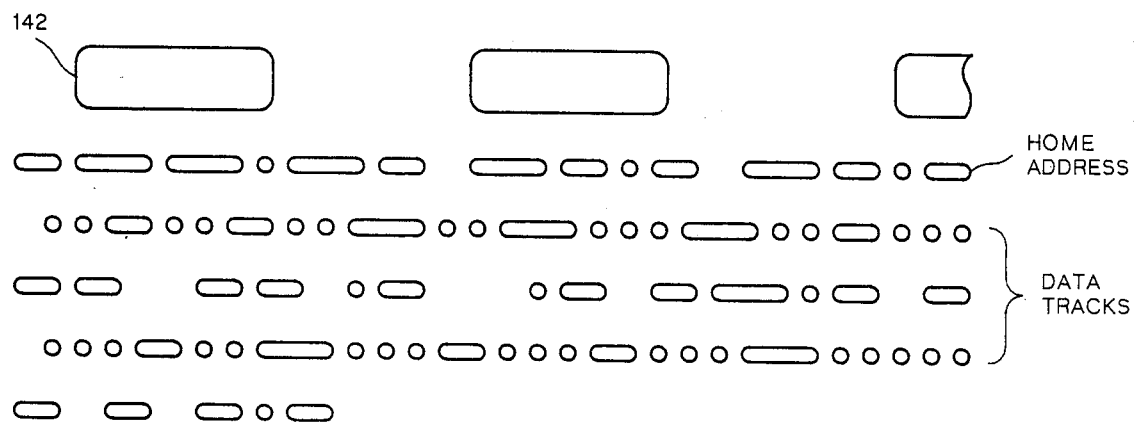
FIG. 7 illustrates how data patterns are embedded or marked within the data tracks and coarse servo tracks in accordance with a preferred embodiment of an optical disk used with the optical disk storage system of FIG. 4.

In the preferred embodiment, the actual type of data patterns that are placed in the coarse servo tracks and data tracks are illustrated in FIG. 7. A coarse servo track 142 includes a pattern of marks that include a reflectivity-high segment followed by a reflectivity-low segment. As described in the aforecited patent applications, these coarse servo tracks 142 are illuminated with a separate light source included within the head position servo 86 and are used to position the read head 81 at a desired radial position with respect to the disk. The data tracks themselves have the data stored therein through a similar reflectivity-high/reflectivity-low pattern. Typically, an appropriate encoding scheme, such as a 2, 7 code, is employed to encode the data prior to writing it on the disk. Such a code, marks data transitions (transitions from binary 1's to binary 0's and visa versa) rather than marking the disk if a binary "1" is present, and not marking it if a binary "0" is present, or vice versa. Hence, in FIG. 7, the actual transition from a reflectivity-high to a reflectivity-low point along a given data track would correspond to a similar transition from a binary 0 to a binary 1 (or visa versa) in the data pattern.

It is to be understood that the diagram of the optical disk storage system shown in FIG. 4 is a simplified version of the entire system that is used. Nonetheless, it best illustrates how the beam alignment system of the present invention, comprising the elements encircled by the dashed line 160, is utilized within such a system.

Figure 8:
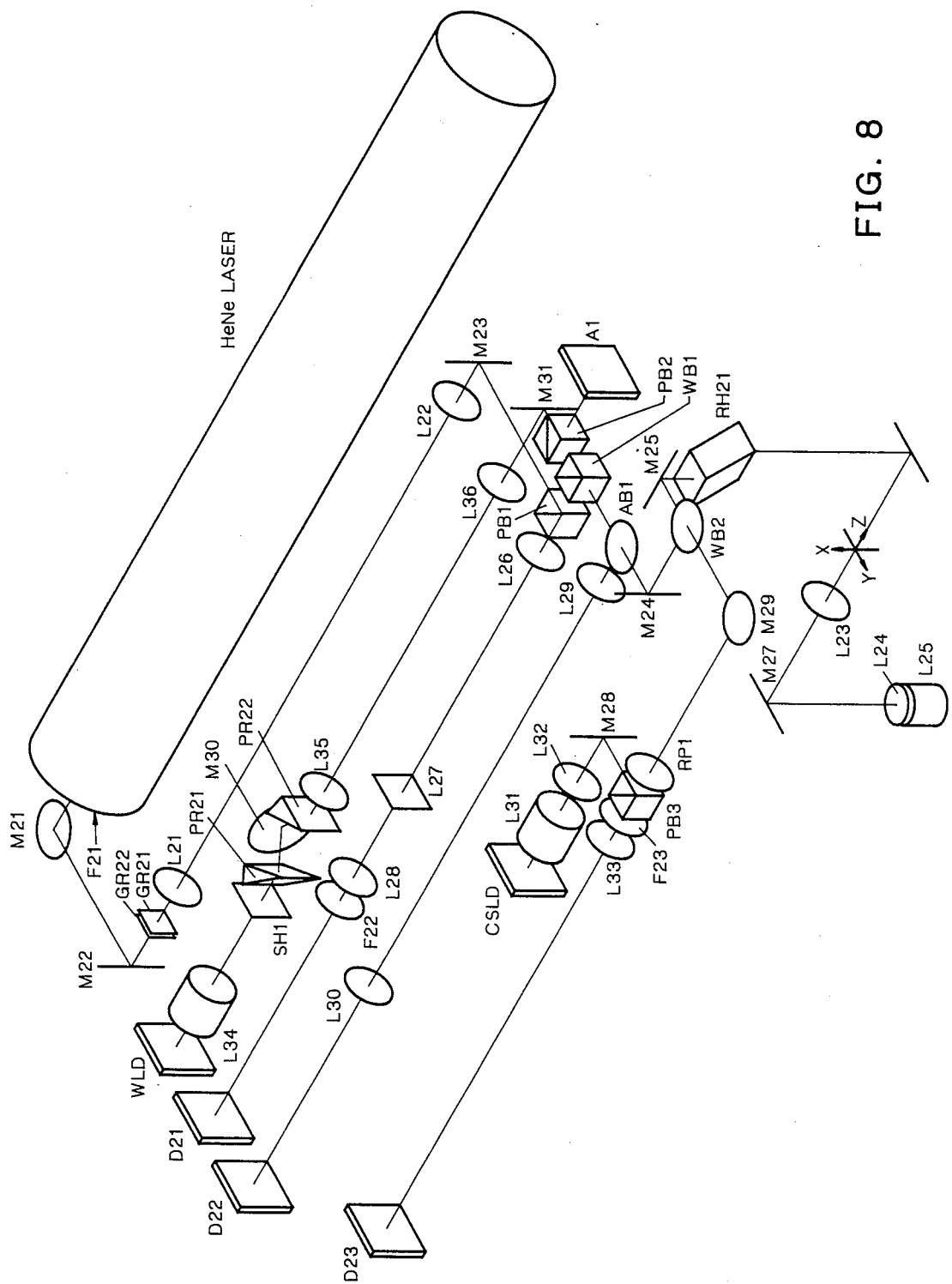
FIGS. 8, 9, 10 and 11 are figures relating to Appendix A, attached hereto, which Appendix describes the optical components used in connection with the preferred embodiment of the optical disk storage system of FIG. 4, more particularly.

A more detailed diagram of the optical components used with the preferred embodiment of the present invention is illustrated in the optical schematic diagram shown in FIG. 8. These optical components, and the function they perform are more fully described in Appendix A, attached hereto and incorporated herein by reference. FIGS. 8, 9, 10, and 11, are explained in connection with Appendix A.

While the invention herein disclosed has been described by means of specific embodiments and applications thereof, numerous modifications and variations could be made thereto by those skilled in the art without departing from the spirit and scope of the present invention. Accordingly, it is to be understood that within the scope of the appended claims, the invention may be practiced otherwise than as specifically described herein.

APPENDIX A

LASER/OPTICAL COMPONENTS

The Laser/Optical Components associated with the Optical Drive Storage System for use with the beam alignment system of the present invention are physically provided in two separate assemblies. The Fixed Optics assemblies are mounted to the frame and may contain the following units as referenced in FIG. 8:

1. Write Laser Diode Module (WLD, L34, L35, L36, SH1, PR211, PR212, and M30)
2. HeNe Read Laser
3. Write Alignment Actuator (GA2)
4. Radial Tracking Actuator (GA1)
5. Complex Grating (GR21 and GR22)
6. Read Collimating Telescope (121 and L22)
7. Write Alignment Detector (D22)
8. Astigmatic Optics (L26, L27 and L28)
9. Read/Focus/Track Detector (D21)
10. Read/Write Beam Combiner (WB1)
11. Read/Write/Coarse Seek Beam Combiner (WB2)
12. Read Beamsplitter (PB1)
13. Write Beamsplitter (PB2)
14. Amplitude Beamsplitter (AB1)
15. Coarse Seek Laser Diode (CSLD)
16. Coarse Seek Beamsplitter (PB3)
17. Coarse Seek Detector (D23)
18. Fresnel Rhomb Prism
19. Associated mirrors, lenses, prisms, absorber, filters, shutter, and retarder plate The Moving Carriage Optics, mounted on the Moving Carriage, provide the other assembly. Included in this assembly are:

1. Imaging/Beam Shaping Telescope (L23 and L24)
2. Objective Lens and Focus Actuator (L25)
3. Beam-Folding Mirror (M27)

1.0 Optical Components

The following paragraphs describe the optical components in detail and their functions with relation to both reading and writing on the disk platter. Reference designations are with reference to FIG. 8.

1.1 Read Laser

The HeNe laser provides the raw 633 nm wavelength beam required for read operations. This gas laser source has a nominal output of 5 mW and produces a nominally collimated beam of light having a diameter of 0.83 mm. The raw beam is transmitted by Filter 21 and reflected by two mirrors (M21 and M22) onto a transmissive grating (Complex Grating). It then passes through a system of lenses, beamsplitters, and related optics before it is incident upon the disk.

F21 functions as a neutral density filter and absorbs or reflects some of the 633 nm light and transmits the rest through the system. It is 15 mm in diameter and 3 mm thick. M21 and M22 are each 20 mm in diameter and 5 mm thick and have a 10-5 surface finish on the narrow central working aperture.

1.2 Complex Grating

The Complex Grating Subassembly (GR21 and GR22) is a transmissive grating system which diffracts the raw HeNe laser beam into six separate beams of light. It actually consists of two gratings placed back-to-back which separate the incoming laser beam into an array of beams.

The initial beam is incident perpendicular to the grating substrate. Of the six exiting beams one is parallel to the optical axis; the other five beams come out at angles corresponding to the spacing of the rulings on the gratings. The first grating is a transmissive grating which diffracts power from the zero (undiffracted) order into the $\pm 1$ orders, thus providing three beams. The second grating is a blazed transmissive grating which diffracts power into the $\pm 1$ order; thus, it splits each of the three spots into a pair of spots. The net effect of the Complex Grating is, therefore, to form an array of six beams from the raw HeNe laser beam.

When these six beams are focused at the disk to form six spots, four are used to derive tracking error signals, two are used for reading, and one of the read spots is simultaneously used to derive a focus error signal. They are referred to as: Read Previous Track, Readback Check, and Tracking No. 1, No. 2, No. 3, and No. 4.

1.3 Read Collimating Telescope

The Read Collimating Telescope consists of two infinite conjugate doublets, L21 and L22. L21 has a focal length of 24 mm; L22 has a focal length of 252 mm. The telescope serves two purposes: to expand the six beams of light and to image the recollimated beams onto the Radial Tracking Actuator mirror (GA1 and M24). It works in conjunction with the Imaging/Beam Shaping Telescope to provide the necessary beam diameter and imaging at the objective.

After transmission through the collimating telescope which expands all six beams to a diameter appropriate for the carriage optics, the beams are incident upon folding mirror M23. The mirror, which is 24 mm in diameter and 5 mm thick, reflects the beams through the system to the Radial Tracking Actuator mirror M24 which is positioned at an image plane of the grating.

1.4 Read Beamsplitter

The Read Beamsplitter (PB1) may be a polarization sensitive cube beamsplitter with a dimension of 15 mm on each side. It is coated on the diagonal and directs the read beam depending upon its path, to or from the disk. Headed towards the disk the read beam is S polarized whereas the return beam is P polarized. The incoming beam reflects off the beamsplitter and passes onto the Read/Write Beam Combiner. The reflected beam is transmitted through the Read Beamsplitter to the Read/Focus/Track Detector train. Alternatively, this same function may be realized with a spatial beamsplitter wherein beams are either reflected in a desired direction by a reflective surface that is precisely positioned therein or not so reflected depending upon the spacing or distance between the beams. A spatial beamsplitter does not require that the beams be polarized.

1.5 Read/Write Beam Combiner

The Read/Write Beam Combiner WB1 is a wavelength beam combiner. It is a cube with a dimension of 15 mm on each side. The combiner is coated with a on the diagonal to transmit the 835 nm wavelength of the infrared Write Laser Diode and reflect the 633 nm wavelength of the read HeNe laser. This special coating on the combiner allows the read and write beams to be combined efficiently on their way to the disk.

The read beam is reflected by the Read Polarization Beamsplitter onto the Read/Write Combiner. The write beam is transmitted by the Write Polarization Beamsplitter onto the Read/Write Combiner. The combined beams are then incident upon the Amplitude Beamsplitter.

The Read/Write Combiner acts as a beamsplitter with respect to the returning read and write beams. The returning write beam passes through the combiner and is sent back to the Write Polarization Beamsplitter. The returning read beam is again reflected off the combiner and transmitted by the Read Polarization Beamsplitter to the Read/Focus/Track Detector.

1.6 Amplitude Beamsplitter

The Amplitude Beamsplitter (AB1) is a cube beamsplitter with a dimension of 15 mm on each side. It has a dielectric coating which causes most of the 633 nm read light and 835 nm write light to be transmitted through the diagonal. A small fraction of both the read and write light is reflected by the beamsplitter.

Coming from the Read/Write Combiner the incoming combined beams reach the Amplitude Beamsplitter. The beamsplitter reflects a small portion of the read and write beams down to the Write Alignment Detector which measures their relative alignment. The larger portion of each beam is transmitted by the beamsplitter and goes onto the Carriage Optics.

Most of the light from both the returning read and write beams is transmitted back through the Amplitude Beamsplitter. A minute portion of light from both beams is reflected off the beamsplitter and is not used.

1.7 Radial Tracking Actuator

The Radial Tracking Actuator (GA1) is a galvanometer with Mirror M24 mounted on it. It works in conjunction with the Read/Focus/Track Detector to maintain radial alignment of the read beam with respect to tracks on the disk.

As previously described the Read Collimating Telescope images the Complex Grating onto the galvanometer mirror which is a rectangle 13 mm by 17 mm. The mirror is positioned on the galvo so that the face of the mirror pivots about the center of the 17 mm dimension. The effect of the collimating telescopic action is to reduce the mirror weight and size. It, therefrom, minimized the galvanometer moving mass. The reduction in mass produces a fast response time in terms of maintaining alignment and increases the capability of writing at an extremely high data rate.

The galvanometer mirror is imaged by the Imaging/Beam Shaping Telescope so that the image is placed at the entrance pupil of the Objective lens. If the grating and galvanometer are correctly imaged, the aperture is properly filled, allowing the maximum amount of light to pass through the Objective Lens (L25) and focus on the disk.

1.8 Read/Write/Coarse Seek Combiner

The Read/Write/Coarse Seek Combiner (WB2) is a wavelength beam combiner. It plays a significant role in the optical system. It combines the HeNe beam, Write beam and Coarse seek beam and sends the combined beam to the Carriage Optics. In actuality, it is a plate beamsplitter 20 mm in diameter, 5 mm thick, and is coated to manage both the parallel and perpendicular polarizations of the three beams directed towards the disk and the flipped polarizations of the returning beams.

The front surface of the combiner reflects the 835 nm write light and the 633 nm read light while the antireflection coating on the rear transmits the 780 nm coarse seek beam. The read and write beams reflected by the Radial Tracking Actuator are also reflected by the combiner while the coarse seek beam is transmitted. Thus, the three beams are combined and transmitted by the rhomb prism and to reach the Carriage Optics.

With respect to the returning beams the combiner acts like a beamsplitter. The three reflected beams reach the combiner. The read and write beams reflect off of it and are sent to the Radial Tracking Actuator. The coarse seek beam is transmitted and sent down to the Coarse Seek Detector.

1.9 Rhomb Prism

The Fresnel Rhomb Prism (RH21), rhomboidal in shape, functions as an achromatic quarter wave plate. It is a parallelogram in cross section, the angle of the parallelogram being approximately 55°. The front face of the prism is a square aperture, 20 mm on a side.

The prism works in conjunction with the polarization sensitive beamsplitter to direct the paths of the beams. Each of the three laser beams enters the prism perpendicular to its front face. Once in the prism the linear polarization of each beam is changed to a circular polarization. When the beams reflect back from the disk the circular polarization is rotated. The rotated circularly polarized wavefronts are changed into linearly polarized wavefronts when transmitted through the rhomb but with linear polarizations at an angle 90° to what they were previously.

Mirror M25 reflects the beams into and out of the prism. It is 24 mm in diameter and 5 mm thick. Mirror M26 receives the beams from M25 and makes them collinear with the optical axis of the carriage optics. It is 30 mm in diameter and 5 mm thick.

1.10 Imaging/Beam Shaping Telescope

The Imaging/Beam Shaping Telescope consists of two infinite conjugate lenses, L23 and L24. L23 is an achromatic doublet with a focal length of 86.4 mm. L24 is also achromatic and has a focal length of 39.3 mm. Mirror M27 is a Beam-Folding Mirror which passes the beam from L23 to L24. It is 12 mm in diameter, 3 mm thick and reflects the 633, 780, and 835 nm wavelengths equally. Additionally, it reflects the S and P polarizations equally.

The primary purpose of the telescope is change the beam diameters to match the entrance pupil of the Objective Lens. If the diameters are correct the aperture of the Objective Lens is properly filled and the maximum amount of light can pass through the lens to focus on the disk. The beam coming out of L24 and reaching the Objective Lens has been demagnified 2.2 to 1 since leaving the galvanometer mirror. The second function of the telescope is to image the Radial Tracking Actuator mirror into the pupil of the objective lens.

1.11 Objective Lens

L25 is the objective lens which focuses the read, write and coarse seek beams on the disk. It is a circular lens with a 0.60 numeral aperture and an entrance pupil diameter of 4.22 mm. The collimated light coming into the lens is focused at the disk. The lens is mounted into the focus actuator which is responsible for the correct spatial distance between the objective and the disk.

The focus actuator maintains focus within an accuracy of ±0.12 microns. Essentially, it is a wire wrapped tube surrounded by magnets. Current passing through the coil creates an electromagnetic field determining the distance and direction of the tube movement. Tube movement shifts the lens with respect to the disk when signals are received from the Track Detector electronics. A spring mechanism prevents extreme movements either towards or away from the disk.

1.12 Astigmatic Optics

The Astigmatic Optics consists of three lenses: L26, L27, and L28. They are located on the Read/Focus/Track Detector train between the Read Polarizing Beamsplitters and the Read/Focus/Track Detector. L26 is an achromatic doublet with a positive focal length of 240 mm. L27 is a spherical lens with negative focal length of $-125$ mm. L28 is a cylindrical lens with a positive focal length of 250 mm. L26 and L27 work together to form a front spherical lens for a standard astigmatic optics system. L28 receives the circular beam from L27 and introduces an astigmatism so that the spatial pattern of the beam is sensitive to small amounts of defocus of the objective lens with respect to the disk.

All six read beams pass through the astigmatic optics to reach the Read/Focus/Track Detector. To illustrate how the Astigmatic Optics are used note that the Read Previous Track spot reflects from the disk and passes through the Astigmatic Optics to reach the Read/Focus/Track Detector. Because L28 is cylindrical it produces two focal planes, each oriented on a different axis. If the spot at the disk is in focus it passes through L26, L27, and L28 and produces a circularly symmetric blur circle between the two axes at the Read/Focus/Track Detector plane. If the spot is out of focus at the disk it passes through the Astigmatic Optics and produces an ellipse in either a positive or negative direction, causing a focus error signal to be generated. Refer to FIGS. 4–16.

1.13 Read/Focus/Track Detector

The Read/Focus/Track Detector (D21) is an array of detectors which receives read signals reflected from the disk and converts the reflected signals into read data, focus error information, and fine tracking information. It provides a signal for the Radial Tracking Actuator to keep the Read beam radially aligned with the disk. A reflected read beam from the disk passes through the Astigmatic Optics and Filter F22 and reaches the Read/Focus/Track Detector. If the read beam is improperly positioned on a fine track or is off track the detector receives the information and converts it into an electronic signal. The signal causes the Radial Tracking Actuator mirror to pivot to realign the beam.

D21 consists of a single chip with nine separate photosensitive elements. Five of the elements are circular with a diameter of 1.20+/−0.05 mm. The additional four elements form a quad array, each element being square and 0.44 on a side. The diameter of each light spot on the array elements is 0.8 mm.

F22 is located on the Read/Focus/Track Detector train in close proximity to the detector. It transmits greater than 98% of any infrared light. F22 prevents any stray 835 nm wavelength light from returning through the system to the Read/Focus/Track Detector. The filter is 15 mm in diameter and 3 mm thick.

1.14 Write Laser Diode Module

The Write Laser Diode Module is a Field Replaceable Unit which consists of the Write Laser Diode (WLD), Collimator Lens L34, Shutter SH1, the Prism Beam Expander (PR211, M30 and PR212) and a Collimating Telescope (L35 and L36). The module components produce a circularly symmetric beam for recording on the disk. The following paragraphs detail each of the components.

1.14.1 Write Laser Diode

The Write Laser Diode (WLD) is a 20 mW infrared light source with a wavelength of 835 nm (Tables A-1 through A-3). It is the beam which makes marks or pits on the disk platter surface. The elliptical beam is emitted from the rectangular laser facet, is collimated, and made circularly symmetric as it goes through the module prisms and lenses.

1.14.2 Write Beam Collimator Lens

The Write Beam Collimator Lens (L34) is a spherical lens which collects and collimates the light from the laser diode facet. It has the same specifications as Objective lens L25 with a 0.60 numeral aperture and an entrance pupil of 4.22 mm.

1.14.3 Shutter

The Shutter (SH1) is a mechanical device which slides vertically in front of L34. It takes approximately 5 msecs to open. When open the full power of the write laser beam is transmitted through the system to make marks on the disk. When closed the shutter filter permits a small fraction of light to travel through the system. The light, however, does not write on the disk because the power of the light is greatly diminished by the shutter filter. The shutter must be closed to insure an accurate measurement of the radial alignment between the write and Read Previous Track spots. If the shutter were open during a measurement the full power of the write laser would be incident upon the disk and unwanted marking of the disk would occur.

1.14.4 Prism Beam Expander

The Prism Beam Expander (PR211, M30 and PR212) consists of two reflecting prisms and a mirror M30 which reflects the P polarization of the 835 nm write light with high efficiency. The entering face of PR211 and the exit face of PR212 are both 16 mm by 8 mm. Both prisms have a thickness of 8 mm. The included angle between the entering and exit faces varies between 40° and 50° depending upon the laser diode.

The subassembly produces a circularly symmetric beam from the elliptical beam entering the front face of PR211. The narrow dimension of the elliptical spot is expanded as it is transmitted through the prisms while the wide dimensions of the beam remains unchanged. Refraction through the prisms produces the circularly symmetric beam leaving the exit face of PR212.

1.14.5 Collimating Telescope

The Collimating Telescope consists of two sperical doublets, L35 and L36. The purpose of the telescope is to expand the collimated circular beam which comes out of the Prism Beam Expander to the diameter appropriate for the Carriage Optics. The expanded beam is then incident upon the Write Alignment Actuator.

L35 and L36 are specially selected to accommodate the varying divergence angles of laser diodes. L35 ranges in focal length from 40 to 50 mm, and L36 from 120 to 148 mm; the effect of these ranges is to allow the Collimating Telescope to vary in magnification from 2.4 to 3.7X.

1.15 Write Alignment Actuator

The Write Alignment Actuator (GA2) is a galvanometer with mirror M31 mounted on it. The actuator provides radial alignment of the write beam to the read beam. It receives electronic signals from the Write Alignment Detector indicating misalignment. If misalignment occurs the galvanometer mirror M31 is tilted to reposition the write beam and correct alignment.

M31 is rectangle 13 mm by 17 mm. It pivots about the center of the 17 mm dimension.

1.16 Write Alignment Detector

The Write Alignment Detector (D22) senses radial misalignment of the write beam with respect to the read beam. It is manufactured by United Detector Technology, Model PN SC-4D, with an active surface of 2.5 mm by 2.5 mm. The detector provides two-dimensional error information for the radial position error between the read and write beams. Both the Readback Check spot and the write spot are imaged upon this detector when the shutter is closed at which time the detector senses the radial distance between the two. Based on that distance the detector sends an error signal to the Write Alignment Actuator to realign the write beam to the read beam.

1.17 Write Alignment Lens Subassembly

The Write alignment Lens Subassembly includes spherical lenses L29 and L30. They are located between the Amplitude Beamsplitter and the Write Alignment Detector. L29 has a positive focal length of 240 mm; L30 has a negative focal length of −49 mm. The lenses are 250 mm from each other and operate as a single telephoto lens with an effective focal length of 1000 mm. They form an image at the Write Alignment Detector of the Write and Readback Check spot. The lenses are designed so that the other five read spots are not incident upon the Write Alignment Detector.

1.18 Write Beamsplitter

The Write Beamsplitter (PB2) may be a polarization sensitive cube beamsplitter with a dimension of 15 mm on a side. It can accommodate wavelengths ranging from 820 to 850 nm. Directed towards the disk the write beam is P polarized, is transmitted through the Write Polarization Beamsplitter and reaches the Read/Write Combiner. After reflection at the disk the return beam again passes through the Rhomb Prism and becomes S polarized. It reflects off the polarization sensitive beamsplitter and onto an Absorber. Alternatively, this beam splitting function may be carried out using a spatial beamsplitter wherein beams are split off in a desired direction as a function of the distance therebetween, as described in paragraph 1.4 above.

1.19 Coarse Seek Laser Diode

The Coarse Seek Laser Diode (CSLD) is a 5 mw infrared light source with a 780 nm wavelength. Unlike the pulsed Write Laser Diode it is continuously driven. The beam is emitted from a rectangular laser facet, is collected by L31, and becomes astigmatized as it passes through L32.

The coarse seek beam forms a line focus at the disk and upon reflection, returns to the Coarse Seek Detector, indicating the position of the objective lens relative to the center of a particular coarse track. The Detector converts the image into carriage position error information which is relayed to the Voice Coil Motor to appropriately reposition the carriage.

1.20 Coarse Seek Lenses

The coarse seek lenses consist of L31, L32 and L33. Together L31 and L32 provide an illumination profile at the disk. L31 is an 18X objective which nominally collimates the elliptical beam coming from the Coarse Seek Laser reflected beam and works in conjunction with the carriage telescope to form an image plane of the disk on the Coarse Seek Detector.

1.21 Coarse Seek Beamsplitter

The Coarse Seek Beamsplitter (PB3) may be a polarization sensitive cube beamsplitter with a dimension of 15 mm on a side. Going towards the disk the coarse seek beam is S polarized so it is reflected by the Coarse Seek Polarization Beamsplitter to the Read/Write/Coarse Seek Combiner. After reflection at the disk and a second transmission through the Rhomb, the beam is P polarized so it is transmitted by the beamsplitter and is incident upon the Coarse Seek Detector. Alternatively, a spatial beamsplitter may be used for this function as described above in paragraph 1.4, in which case the coarse seek beam need not be polarized.

1.22 Retarder Plate

The Retarder Plate (PP1) is a quartz retarder plate of multiple order to accommodate the wavelength variations coming from the Coarse Seek Laser diode. It changes the direction of polarization and works in conjunction with the Rhomb Prism to achieve the right degree of polarization for the coarse seek beam to correctly illuminate the disk and form an image plane on the Coarse Seek Detector. The convergent/divergent light in the uncollimated coarse seek beam produces unequal polarization changes when passing through the Rhomb. The Retarder Plate works with the quarter wave plate action of the Rhomb to properly adjust the polarizations.

1.23 Filter F23 and Mirror M29

Filter F23 is located between the Coarse Seek Detector and the Coarse Seek Polarization Beamsplitter. It is 15 mm in diameter and 3 mm thick. It transmits the coarse seek beam with greater than 94% efficiency and blocks 98% of 835 nm light. M29, located between the Retarder Plate and Read/Write/Coarse Seek Combiner reflects the coarse seek beam into and out of the Carriage Optics. Additionally, it transmits all but a fraction of 633 nm light and so prevents the HeNe light from being incident upon the Coarse Seek Detector. The mirror transmits 633 nm wavelengths through its coating and scatters the light off its rear surface. Any stray 633 nm light reflected from the mirror is blocked by F23 and prevented from forming an image on the Coarse Seek Detector.

1.24 Coarse Seek Detector

The Coarse Seek illumination pattern at the disk is imaged at the Coarse Seek Detector which senses carriage radial position error. If the objective lens is on the optical center a null signal is sensed. If the lens is off center a positive or negative signal is sensed. The detector relays this information to the Voice Coil Motor which repositions the carriage. Additionally, the coarse seek detector allows counting of coarse tracks during a coarse seek.

D23 is a one-dimensional position sensing detector manufactured by United Detector Technology, Model LSC-5D. The active area on the detector is 5.33 mm long by 2.2 mm wide. The disk plane is imaged onto the detector and fills the entire surface area.

2.0 Read Path to Disk

Figure 9:
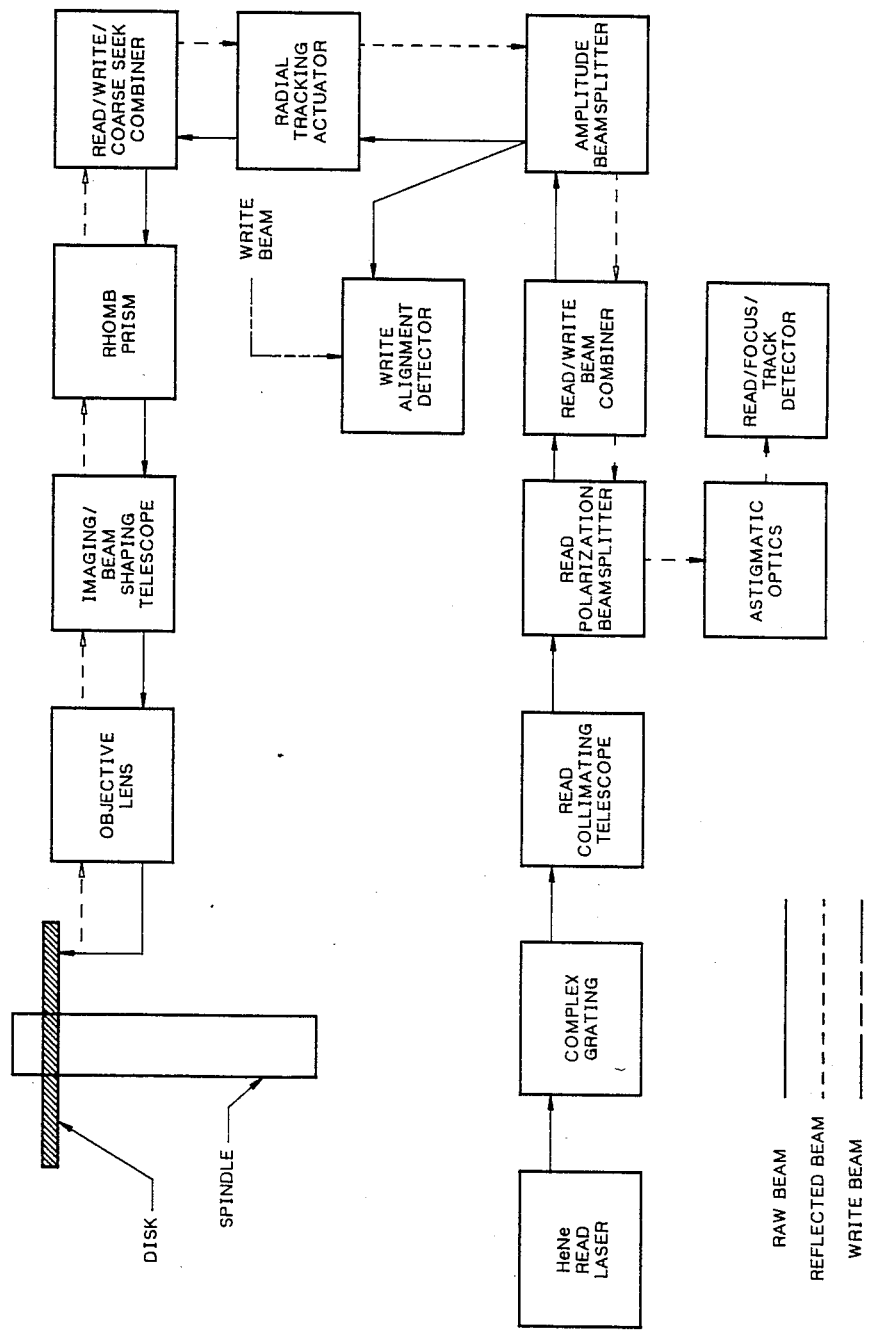

Referring to FIGS. 8 and 9, the 633 nm wavelength HeNe beam leaves the laser housing, is reflected by Mirror M21, transmitted by Filter F21, and reflected by Mirror M22. It is transmitted by the Complex Grating subassembly (GR21 and GR22) which divides the beam into six collimated beams of light which are then expanded by the Read Collimating Telescope (L21 and L22). The light is reflected by Mirror M23, by the Read Beamsplitter (PB1) and the Read/Write Beam Combiner (WB1). It is transmitted by the Amplitude Beamsplitter (AB1) which dirrects a small percentage of the read light out of the main path through lenses L29 and L30 to the Write Alignment Detector (D22).

The read beams transmitted by the Amplitude Beamsplitter are reflected by the Radial Tracking Actuator mirror (GA1 and M24) which is at an image plane of the Complex Grating. The read light is then reflected by the Read/Write Coarse Seek Combiner (WB2) and Mirror M25, and transmitted through the Rhomb Prism (RH21). It is reflected by Mirror M26 to the Carriage Optics which consists of the Imaging/Beam Shaping Telescope and the Ream-folding Mirror (L23, L24 and M27). Finally, the beams enter the entrance pupil of the Objective Lens (L25) through which they are focused to read data from the disk platter.

3.0 Read Path From Disk

The Read beams reflected from the disk are collected by the Objective Lens (L25) and are transmitted by the Imaging/Beam Shaping Telescope and Beam-folding Mirror (L23, L24 and M27). They are reflected by Mirror M26 and transmitted through the Rhomb Prism (RH1). Once through the prism they are reflected by the Read/Write Coarse Seek Combiner (WB2) and the Radial Tracking Actuator mirror (GA1 and M24), are transmitted through the Amplitude Beamsplitter (AB1) and reflected by the Read/Write Beam Combiner (WB1). Due to a 90° rotation of polarization caused by the return pass through the Rhomb Prism (RH1), or due to the spatial separation between the incident and returning read beams, the returning read beams are transmitted through the Read Beamsplitter (PB1). The beams are then sent to the Read/Focus/Track Detector train which consists of the Astigmatic Optics (L26, L27 and L28), and Filter F22. The beams are all finally incident upon the Read/Focus/Track Detector (D21).

4.0 Write Path to Disk

Figure 10:
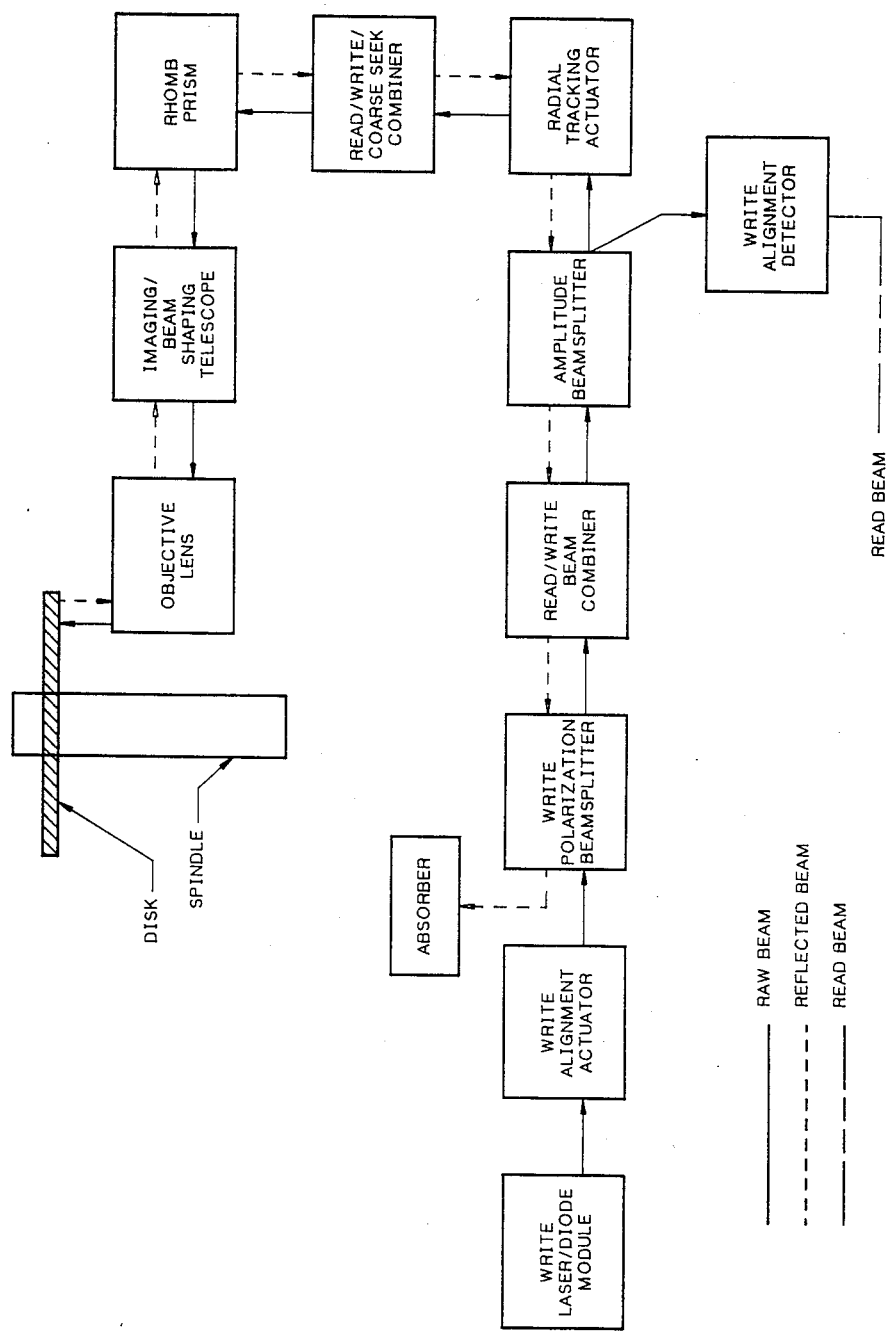

Referring to FIGS. 8 and 10, the write beam originates with the Field Replacement Write Laser Diode Module. The infrared beam is emitted from the diode, is collected and collimated by the Collimator Lens (L34) and is transmitted through Shutter (SH1). The beam is circularized by the Prism Beam Expander subassembly (PR211, M30 and PR212) and is then expanded by the Collimating Telescope (L35 and L36). The expanded beam is reflected by the Write Alignment Actuator mirror (GA2 and M31) and is transmitted by the Write Beamsplitter (PB2) and the Read/Write Beam Combiner (WB1) so that the read and write beams are on a common path. The combined beams reach the Amplitude Beamsplitter which directs a small percentage of both beams to the Write Alignment Detector.

Write light transmitted by the Amplitude Beamsplitter is imaged onto the Radial Tracking Actuator mirror (GA1 and M24), is reflected by the Read/Write Coarse Seek Combiner (WB2) and Mirror M25, and enters the Rhomb Prism (RH21). The beam is transmitted through the Rhomb Prism and reflected by Mirror M26. It is expanded through the Imaging/Beam Shaping Telescope and Beam-Folding Mirror (L23, L24 and M27) and finally enters the entrance pupil of the Objective Lens (L25) through which it focuses to write upon the disk.

5.0 Write Path From Disk

The Write beam reflected by the disk is collected by the Objective lens (L25), is transmitted by the Imaging-/Beam Shaping Telescope and Beam-Folding Mirror (L23, L24 and M27), is reflected by Mirror M26, and transmitted by the Rhomb Prism. Once through the Rhomb Prism it is reflected by the Read/Write/Coarse Seek Combiner and strikes the surface of the Radial Tracking Actuator mirror (GA1 and M24). It is reflected by the actuator and transmitted through the Amplitude Beamsplitter (AB1) and the Read/Write Beam Combiner (WB1). The returning write beam is reflected by the Write Beamsplitter (PB2) and passes onto an Absorber which impedes any further travel of the beam.

6.0 Coarse Seek Path to Disk

Figure 11:
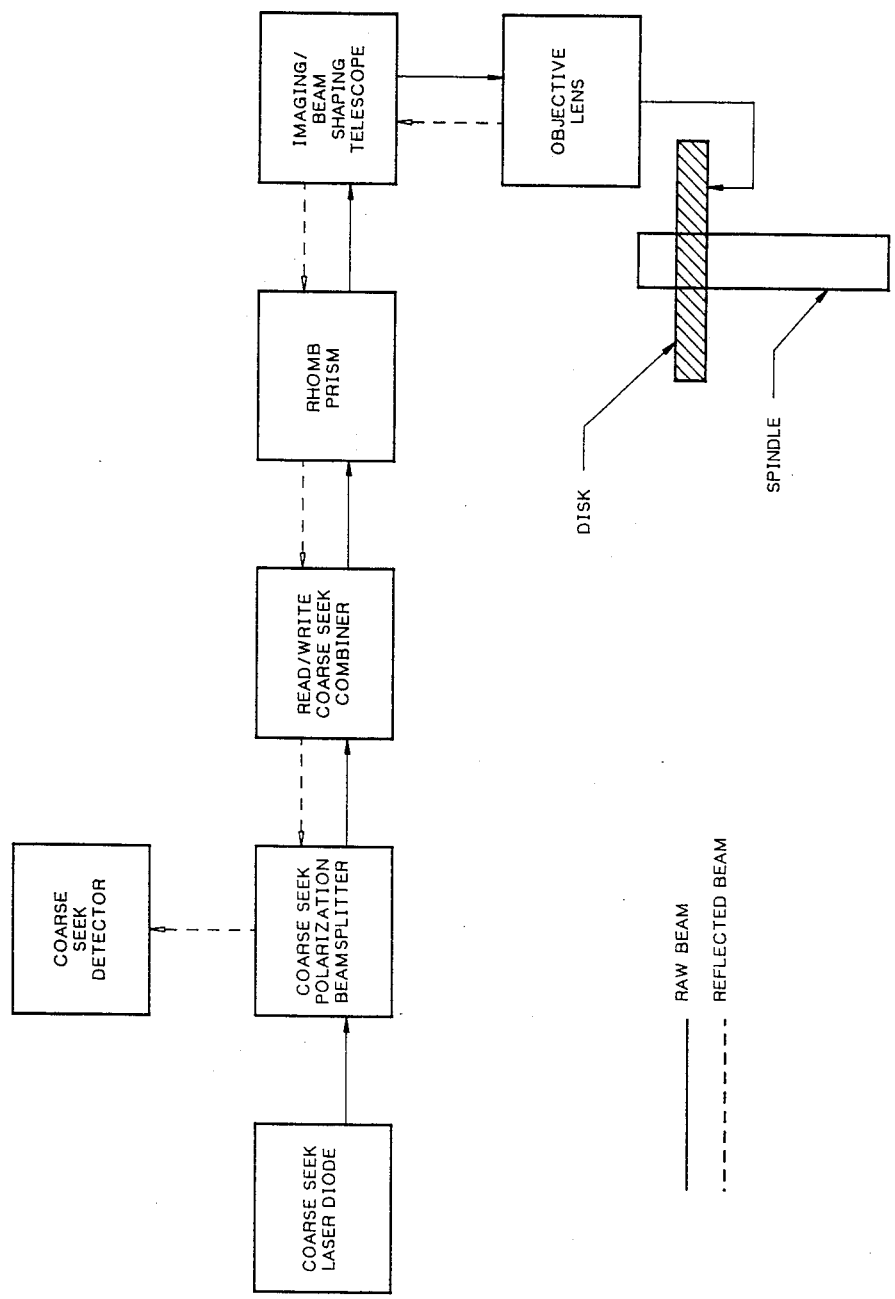

With reference to FIGS. 8 and 11, the Coarse Seek Path to the disk platter originates at the Coarse Seek Laser Diode (CSLD). The 780 nm infrared light is collected by a collimator lens (L31) and a cylindrical lens (L32). It is reflected by Mirror M28 and the Coarse Seek Beamsplitter (PB3). The beam is transmitted by the Retarder Plate (RP1), reflected by Mirror M29 and transmitted through the Read/Write/Coarse Seek Combiner (WB2). The Coarse Seek beam then follows the same path as the HeNe and write laser light to the disk. The beam is transmitted through the Rhomb Prism and is reflected by Mirror M26. It is expanded in the Imaging/Beam Shaping Telescope and Beam-Folding Mirror (L23, L24 and M27) and passes through the Objective lens to reach the disk.

7.0 Coarse Seek Path From Disk

The return Coarse Seek beam comes out of the Objective Lens, passes through the Imaging/Beam Shaping Telescope and Beam-Folding Mirror (L23, L24 and M27), and is reflected by Mirror M26. It is transmitted through the Rhomb Prism and the Read/Write/Coarse Seek Combiner (WB2) and reflected by Mirror M29. The reflected beam is transmitted through the Coarse Seek Beamsplitter (PB3). The beam passes through Convex Lens L33 and Filter F23 until it is finally incident upon the Coarse Seek Detector (D23).

What is claimed is:

1. A method for generating a position control signal for use in a beam alignment system, said beam alignment system being adapted to maintain a prescribed alignment between first and second beams that travel along an optical path, said beam alignment system having a detector included therein that generates a position signal representative of the position at which a beam of radiation, or at which the centroid associated with a plurality of beams of radiation, falls upon a surface of said detector, said method comprising the steps of:

(a) splitting a portion of said first and second beams away from said optical path such that the alignment between said split beam portions represents the alignment of said first and second beams;

(b) focusing said first and second split beam portions onto the surface of said detector;

(c) turning off said second beam, thereby leaving only the split beam portion from said first beam as the beam falling upon the surface of the detector;

(d) storing the detected position signal of the beam falling upon the detector in step (c);

(e) turning on said second beam, thereby having the split beam portions from said first and second beams as the beams falling upon the surface of the detector;

(f) storing the detected position signal of the centroid associated with the beams falling upon the detector in step (e);

(g) determining the offset associated with the detector when no beams are falling upon the surface thereof;

(h) correcting the position signal stored in step (d) to remove the offset therefrom determined in step (g);

(i) generating a corrected position signal representative of the position at which the second beam portion is falling upon the surface of the detector based upon the signals stored in steps (d), (f), and (g), said corrected position signal having the effects of the offset measured in step (g) removed therefrom;

(j) finding the difference between the position signal stored in step (d) and the position signal generated in step (g); and (k) deriving the desired position control signal from the difference found in step (j).

2. The method of claim 1 wherein step (k) comprises:
(1) comparing the difference between the two position signals found in step (j) with a desired difference signal, and
(2) generating an error signal representing the difference between the compared position signals of step (k) (1), and
(3) deriving the desired position control signal from said error signal.

3. The method of claim 1 further including the steps of normalizing the position signals generated in steps (c) and (e) to remove therefrom substantially all variations caused by intensity variations of the split beam portions falling upon the surface of the detector.

4. The method of claim 1 wherein step (g) comprises blocking both of said first and second split beam portions so that neither falls upon the surface of said detector.

5. A system for generating a position control signal for use in a beam alignment system, said beam alignment system being adapted to maintain a prescribed alignment between a first and second beam that travel along an optical path, said beam alignment system having a detector included therein that generates a position signal representative of the position at which a beam of radiation, or at which a centroid associated with a plurality of beams of radiation, falls upon a surface of said detector, said system comprising:

means for directing said first beam as the only beam falling upon the surface of the detector, whereby the detector generates a first position signal representative of the position at which the first beam falls on the surface thereof;

means for storing the first position signal generated by said detector;

means for directing said first and second beams as the beams falling upon the surface of the detector, whereby the detector generates a combined position signal representative of the position at which a centroid of the first and second beams falls on the surface thereof;

signal generation means responsive to the first position stored in said first position signal storing means for generating a second position signal representative of the position at which the second beam falls upon the surface of the detector during the time that both the first and second beams are falling thereon; and means for correcting the first and second position signals in order to remove therefrom the effects of a detector offset signal;

means for determining a difference signal representative of the difference between said corrected first and second position signals, said position control signal being derived from said difference signal.

6. The system of claim 5 wherein said signal generation means comprises means for computing said second position signal as the difference between said stored first position signal and said combined position signal.

7. The system of claim 5 further including signal normalization means for normalizing said first and combined position signals to remove variations therein attributable to intensity variations of the first and second split beam portions falling on the surface of the detector.

8. The system of claim 5 wherein said offset correcting means comprises:
means for preventing any beams from falling upon the surface of the detector;
means for measuring and storing a response of said detector when no beams are present, said detector response including the generation of said detector offset signal; and
means for subtracting the offset response from said first position signal.

9. The system of claim 8 wherein said signal generation means includes means for computing said second position signal as the difference between said stored first position signal and said combined position signal, said stored first position signal and said combined position signal having said detector offset included therein, whereby said detector offset is subtracted out of said second position signal when said second position signal is computed.

10. A system for generating a position control signal for use in a beam alignment system, said beam alignment system being adapted to maintain a prescribed alignment between a first and second beam that travel along an optical path, said beam alignment system having a detector included therein that generates a set of position signals that indicates the position at which a beam of radiation, or at which an energy centroid associated with a plurality of beams of radiation, falls upon a surface of said detector, said system comprising;

normalization means for removing from said set of position signals variations attributable to the intensity of said first and second beams;

first storage means for storing a first set of position signals associated with said first beam while said second beam is turned off;

signal generation means, responsive to the stored first set of position signals held in said first storage means, for generating a second set of position signals representative of the position of said second beam while both said first and second beams are turned on; and comparison means for comparing the first and second sets of position signals and for generating said position control signal in response to said comparison.

11. The system of claim 10 wherein said normalization means comprises:
summing means for summing the signals included within the set of position signals generated by said detector to produce a sum signal;
difference means for subtracting the signals included within the set of position signals generated by said detector to produce a difference signal;
dividing means for dividing the difference signal by the sum signal to produce a quotient signal.

12. The system of claim 11 wherein said first storage means stores the sum and difference signals of said first beam as generated by the detector when the second beam is turned off to produce a first set of sum and difference signals.

13. The system of claim 12 wherein said signal generation means comprises means for subtracting the stored sum and difference signals held in said storage means from the sum and difference signals produced when both the first and second beams fall upon the surface of the detector to produce a second set of sum and difference signals.

14. The system of claim 13 wherein said comparison means comprises a difference amplifier that compares the respective quotient signals produced by the dividing means to which said first and second sets of sum and difference signals are applied.

15. The system of claim 10 further including:
second storage means for storing a set of detector offset signals associated with said detector when no beams are falling upon the surface thereof; and
correction means for correcting said first and second sets of position signals to subtract therefrom said set of detector offset signals.

* * * * *